United States Patent [19]

Oldfield

[11] Patent Number: 5,717,892
[45] Date of Patent: Feb. 10, 1998

[54] SELECTIVELY OPERABLE CACHE MEMORY

[75] Inventor: William Henry Oldfield, Ely, United Kingdom

[73] Assignee: Advanced RISC Machines Limited, Cambridge, United Kingdom

[21] Appl. No.: 852,120

[22] Filed: May 6, 1997

Related U.S. Application Data

[63] Continuation of Ser. No. 445,676, May 22, 1995, abandoned.

[30] Foreign Application Priority Data

Jan. 17, 1995 [GB] United Kingdom ............... 9500847

[51] Int. Cl.$^6$ .................................................. G06F 12/00
[52] U.S. Cl. ................... 395/455; 395/403; 395/405; 395/421.03; 395/438; 395/464; 395/494
[58] Field of Search ........................... 395/403, 405, 395/421.03, 438, 455, 494, 464

[56] References Cited

U.S. PATENT DOCUMENTS

| | | | |
|---|---|---|---|
| 4,317,181 | 2/1982 | Teza et al. | 364/707 |
| 4,862,348 | 8/1989 | Nakamura | 395/750 |
| 5,018,061 | 5/1991 | Kishigami et al. | 395/403 |
| 5,083,266 | 1/1992 | Watanabe | 395/275 |
| 5,519,667 | 5/1996 | Harston | 365/235 |

FOREIGN PATENT DOCUMENTS

| | | |
|---|---|---|
| 0 067 657 A2 | 12/1982 | European Pat. Off. . |
| 0 180 369 A2 | 5/1986 | European Pat. Off. . |

*Primary Examiner*—Eddie P. Chan
*Assistant Examiner*—Hong C. Kim
*Attorney, Agent, or Firm*—Fenwick & West LLP

[57] ABSTRACT

A cache memory in which the address of a required data item is compared with address data stored in a plurality of tag memory sections, a match indicating that the required data item is stored in a corresponding data memory section, is operable in at least a first and a second mode, whereby:

(i) in the first mode, only that one of the data memory sections in which the required data word is stored is enabled for operation once the appropriate data memory section has been identified by an address match with the corresponding tag memory section; and (ii) in the second mode, two or more (and preferably all) of the data memory sections are enabled for operation substantially concurrently with the comparison of the required address and the addresses stored in the tag memory sections, an address match being used to select the output of one of the data memory sections.

9 Claims, 5 Drawing Sheets

SELECTIVELY OPERABLE CACHE MEMORY

This is a continuation of application Ser. No. 08/445,676 filed on May 22, 1995 now abandoned.

BACKGROUND OF THE INVENTION

1. Field of the Invention

This invention relates to accessing cache memories.

2. Description of the Prior Art

It is known to use a cache memory to improve the performance of a central processing unit (CPU) in a data processing system.

A cache memory is a relatively small, high speed random access memory (RAM) which is used to store data which are frequently required by the CPU. Typically, the cache memory is directly accessed by the CPU (rather than via, for example, an external memory management unit (MMU)) and is situated physically close to the CPU in order to reduce the signal propagation time between the CPU and the cache memory. These features mean that data can be stored in or retrieved from the cache memory very quickly.

Since the cache memory stores only a small subset of the data being handled by the data processing system, it is necessary that the CPU knows whether to retrieve a particular data item from the cache memory or from a (slower) system memory. Accordingly, one previously proposed design of a cache memory comprises a tag memory and an associated data memory. The tag memory is used to store system addresses relating to items of data currently held in the cache data memory. When the CPU requires access to a data item, a system address associated with that data item is compared with the addresses held in the tag memory. If the address of the current data item matches an address held in the tag memory then the CPU can access that data item in the data memory.

In some previous designs, the tag memory and the data memory are divided into a number of separate sections, with each data memory section having a corresponding tag memory section. Each tag memory section stores system addresses relating to data items currently held in the corresponding data memory section. In these designs, when the CPU requires access to a data item, the system address associated with that data item is compared with an address held in each of the tag memory sections. When a match is found, the tag memory section holding the matching address switches on (enables) the corresponding data memory section to read the contents of that data item. The other data memory sections are not enabled.

These multi-section, or "associative" cache techniques can reduce the likelihood of a cache "miss" (i.e. the required data item not being in the cache). They also offer reduced power consumption, since only the required data memory section is energised during a read operation. However, they do have the potential disadvantage that each cache access is a two-stage operation, with the tag memory comparison having to be successfully completed before the data memory read operation can begin.

It is an object of the invention to improve the power consumption and the access time of cache memories.

SUMMARY OF THE INVENTION

This invention provides a cache memory comprising:

a plurality of data memory sections, each storing one or more data words, each data memory section being operable to output a stored data word in response to an enable signal;

a plurality of tag memory sections, each corresponding to a respective data memory section, the tag memory sections storing address information indicative of a memory address of each data word stored in the corresponding data memory section; and means for comparing the memory address of a required data word with the address information stored in the tag memory sections, the comparing means generating match signals indicating whether the required data word is stored in one of the data memory sections and, if so, identifying the data memory section in which the required data word is stored;

the cache memory being selectively operable in at least a first mode and a second mode, in which:

(i) in the first mode, only that one of the data memory sections in which the required data word is stored is enabled for operation in response to the match signals; and (ii) in the second mode, two or more of the data memory sections are enabled for operation substantially concurrently with the operation of the comparing means, the match signals being used to select the output of one of the data memory sections.

The invention recognises that faster access can be obtained by running the tag memory comparison and the data memory reading operations in parallel, and then using the tag memory outputs to select the data read from the appropriate one of the data memory sections. By reducing the operation in this way from a two-stage to a one-stage process, broadly speaking the access time can be halved.

However, the invention also recognises that this improvement in access time is at the expense of a greatly increased power consumption for the cache memory. For example, in a cache memory having four sections, the power consumption can increase by a factor of about 3½ if all of the data memory sections are energised for each read operation.

The invention addresses these apparently conflicting requirements by providing a cache memory which is selectively operable in either a serial (two-stage) mode or a parallel (one-stage) mode.

The parallel access can be used when access time is critical, and the slower serial access can be selected in circumstances where, for example, a number of required data items are already buffered for later use (e.g. data processing instructions which are buffered in a prefetch unit).

The skilled man will appreciate that the term "word" can refer to digital data comprising various numbers of bits, and encompasses, for example, a word of 32 bits.

Preferably, each data memory section is operable to store an array of data words, the position of each data word within the array being determined by selected bits of the memory address of that data word.

In order to use the match signals to select the required data memory section output, it is preferred that the cache memory comprises a multiplexer connected to receive data output by each of the data memory sections, the multiplexer being operable to select the output of one of the data memory sections in response to the match signals.

In order to select either the first or second modes, it is preferred that logic means are used for supplying the match signals to the data memory sections as respective enable signals in the first mode of operation, and for enabling all of the data memory sections in the second mode of operation. In a particularly advantageously simple embodiment, the logic means could be an array of logical OR gates for combining active-high match signals with a "second mode/not first mode" control signal.

This invention also provides a central processing unit for accessing data stored in a cache memory as defined above, the central processing unit comprising:

a prefetch unit for prefetching and buffering data processing instructions from the cache memory; and means responsive to the instructions stored in the prefetch unit for controlling the cache memory to operate in either the first mode or the second mode of operation.

Preferably the profetch unit is operable to select the first mode if at least a predetermined number of instructions are buffered in the prefetch unit. It is also preferred that the profetch unit is operable to select the first mode if a branch instruction is detected in the instructions buffered in the prefetch unit.

This invention also provides data processing apparatus comprising:

a cache memory as defined above; and a central processing unit as defined above.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 1:
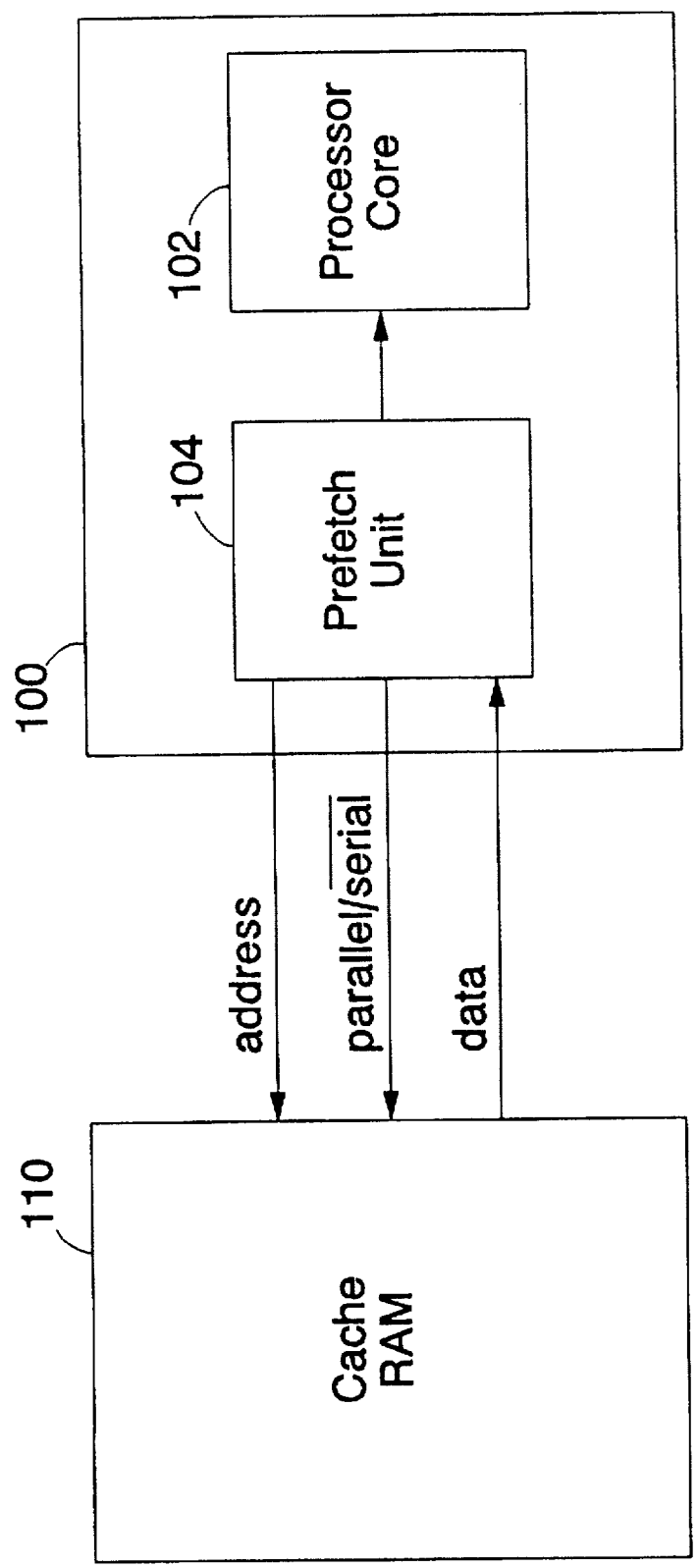
FIG. 1 is a schematic diagram of a data processing apparatus comprising a central processing unit and a cache memory.

Referring now to FIG. 1, a data processing apparatus comprises a central processing unit (CPU) 100 and a cache memory (RAM) 110. The CPU 100 and the cache memory 110 may be fabricated as respective parts of a common integrated circuit.

The operation of the CPU and the cache RAM is shown in highly simplified form in FIG. 1. The CPU comprises a processor core 102 for executing data processing instructions and a prefetch unit 104 for retrieving and buffering instructions from the cache RAM 110.

In operation, the prefetch unit 104 sends an address to the cache RAM 110, specifying the next instruction to be read from the cache RAM. The instruction is read from the cache RAM and passed back to the prefetch unit 104, where it is stored in a first-in-first-out (FIFO) buffer. The processor core takes instructions from the output of the FIFO buffer for execution.

The prefetch unit also sends a further signal to the cache RAM, referred to as a "parallel/not serial" signal. This signal specifies whether the cache RAM should operate in a serial or a parallel access mode. The generation of the parallel/not serial signal by the prefetch unit 104, and the effect of the parallel/not serial signal on the operation of the cache RAM 110, will be described in more detail below.

The parallel/not serial signal is also supplied to control logic (not shown) which controls the operation of various parts of the cache RAM 110 as described below.

Figure 2:
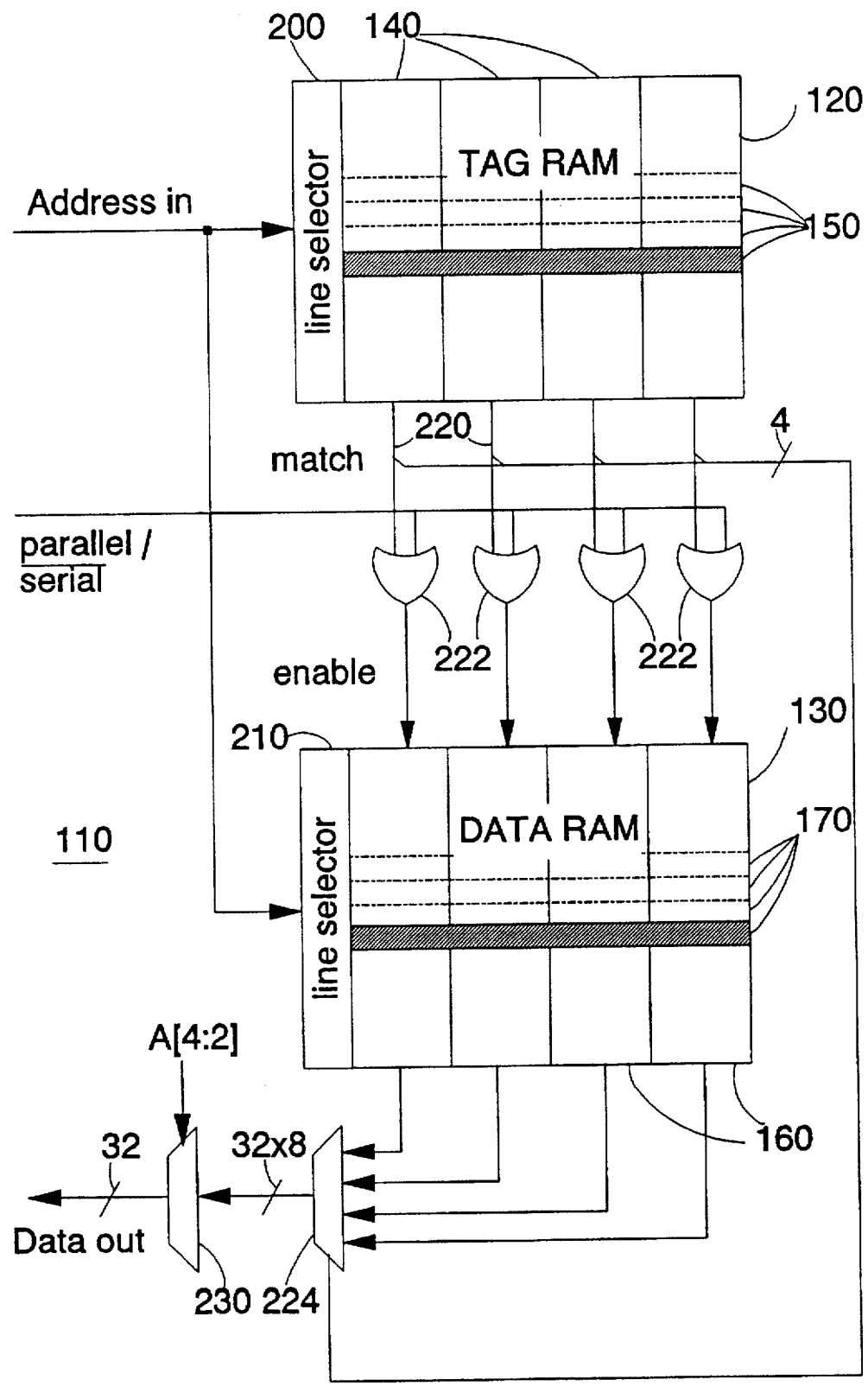
FIG. 2 is a schematic diagram of a cache memory according to an embodiment of the present invention.

Referring to FIG. 2, the cache memory 110 comprises a tag RAM 120 and a data RAM 130. The tag RAM comprises four tag units 140, each of which comprises 64 tag lines 150. Similarly, the data RAM comprises four data RAM units 160, each having 64 cache lines 170. Each cache line stores eight data words, each comprising 32 bits (four bytes) of data.

When the CPU 100 requires access to data having a particular address, it transmits a 32-bit address signal A[31:0] to the cache memory 110. Since this description relates mainly to the prefetching of data processing instructions from the cache RAM 110, a data bus for the transfer of data to the prefetch unit is referred to on FIGS. 2 to 4 as "Data out". However, it will be appreciated that data transfer between the CPU and the cache RAM can be in either direction.

Of the 32 bits of the address signal, the 5th to 10th bits, i.e. A[10:5] are supplied to a tag line selector 200 forming part of the tag 120 and also to a cache line selector 210 forming part of the data RAM 130. These six address bits specify a particular one of the tag lines 150 and the cache lines 170. In FIG. 2 the currently selected tag line 150 and cache line 170 are indicated schematically by heavy shading.

The tag lines 150 store 21 bit addresses corresponding to the 11th to 31st bits of a data address. In order to detect whether data corresponding to a particular data address are stored in the data RAM 130, the 11th to 31st bits of the address generated by the prefetch unit of the CPU 100, i.e. A[31:11], are compared with the content of the currently selected tag line 150 in each of the four tag units 140.

For each tag unit 140, if the contents of the selected tag line in that tag unit 140 are equal to the 21 high order bits A[31:11] of the current address output by the CPU 100, a match signal 220 is set for that tag unit.

The match signals are supplied to respective logical OR gates 222, where they are combined with the parallel/not serial signal from the prefetch unit 104. The effect of this combination is as follows:

1. If the parallel/not serial signal is HIGH (indicating parallel operation of the cache RAM 110) then the output of each of the OR gates 222 is also high. This enables all of the data RAM units 160 straight away, irrespective of the state of the match signals.

In this case, the comparison of the address and the tag entries is carried out in parallel with the reading of the selected cache line 170 from all of the data RAM units. The match signal generated by the tag RAM is not used to select a particular data RAM unit for operation, but instead is used to select the output of one of the data RAM units in a multiplexer 224.

2. If the parallel/not serial signal is LOW (indicating serial operation of the cache RAM 110) then the output of each of the OR gates 222 remains low until one of the match signals goes high. The output of the OR gate for that particular match signal then goes high, thus enabling only that one data RAM unit for which the tag match was found.

In this case, therefore, the energising of the data RAM units is deferred until a match has been found in one of the tag units. Once the match has been found, only the required data RAM unit is energised. This serial or two-stage access technique is slower than the parallel access technique described above, but uses less power because only the required data RAM unit is energised.

The data outputs of the four data RAM units 160 are passed to the multiplexer 224, which passes one of the outputs in dependence on the match signals generated by the tag RAM 120.

When the parallel access mode is in use, a cache line of data will have been read from each of the data RAM units, and the multiplexer 224 is used to select the required one of those lines of data.

In contrast, when the serial access technique is used, only one of the data RAM units will have read out a line of data, and this (by definition) is the required line. However, for simplicity of construction of the present embodiment, the multiplexer remains in the signal path even when the serial technique is used. Since the current data RAM unit is enabled by the same match signal as that supplied to the multiplexer 224, the multiplexer 224 always passes the data line output by the correct data RAM unit.

The line of data (comprising eight data words) output from the multiplexer 224 is then supplied to a multiplexer 230, which selects one of the data words for access in dependence on the 2nd to 4th bits (i.e. A[4:2]) of the address signal output by the CPU 100.

Each output data word is a 32-bit data word containing four bytes of data. Generally the entire 32-bit word is accessed (e.g. during fetching of 32-bit instructions). However, if access to a particular byte is required, the byte to be addressed is indicated by the 0th and 1st bits A[1:0] of the data address.

The addressing function provided by the various portions of the address signal A[31:0] are summarised in the following table:

| Address bits | Function |
| --- | --- |
| A[31:11] | compared with the contents of selected tag line in each tag unit |
| A[10:5] | used to select a tag line in each tag unit and a cache line in each data RAM unit |
| A[4:2] | control multiplexer 230 to select one of eight data words |
| A[1:0] | selects a single byte from a selected 32-bit data word |

Figure 3:
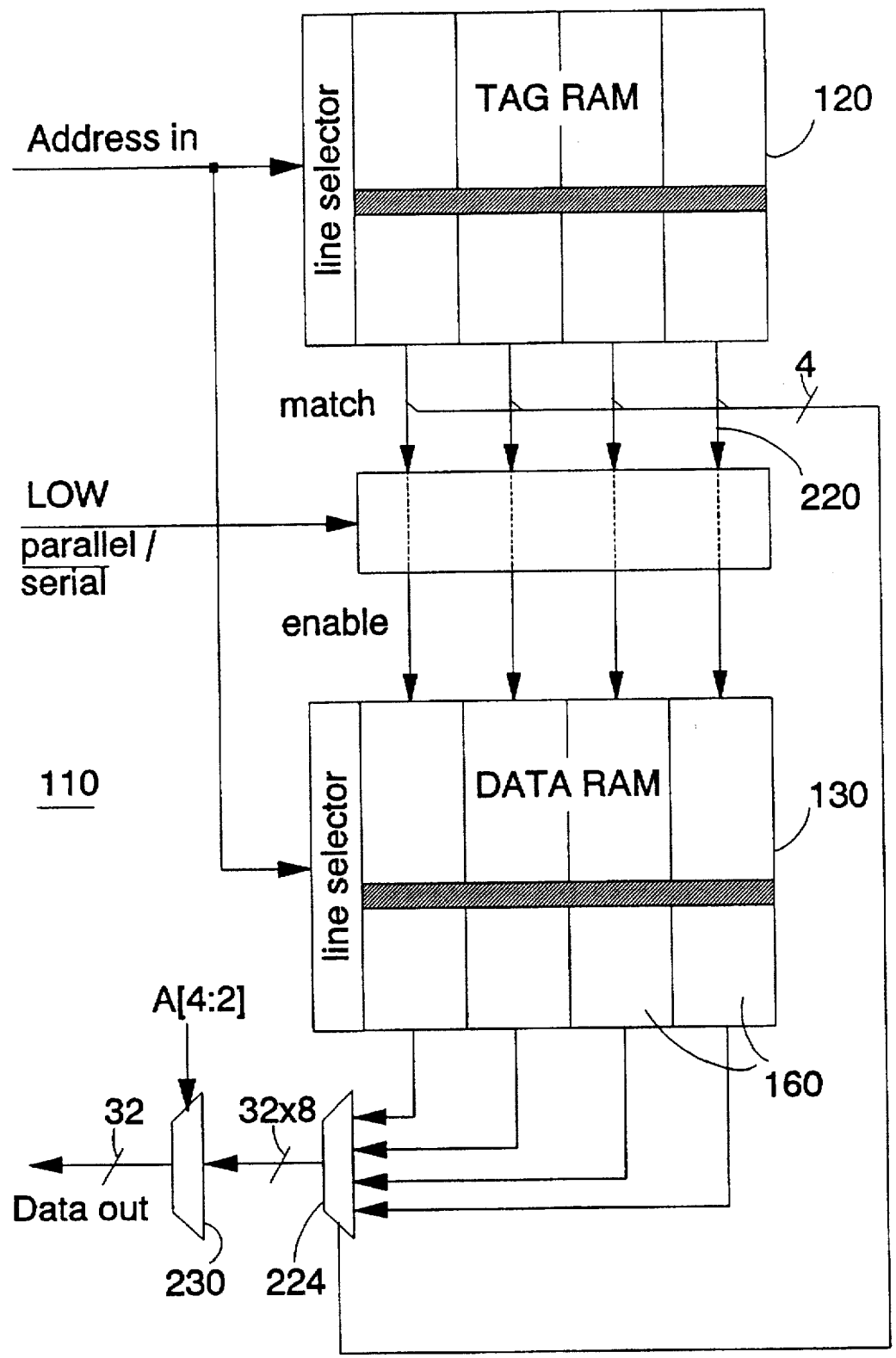
FIG. 3 is a schematic diagram showing the cache memory of FIG. 2 operating in a serial access mode.

FIG. 3 is a schematic diagram showing the operation of the cache RAM 110 in the serial access mode (i.e. the parallel/not serial signal is LOW). Here, the effective operation of the OR gates 222 is shown schematically as a connection between the match outputs 220 of the tag units 140 and the enable inputs of the data RAM units 160. In other words, the match signals are passed directly to enable only the required one of the data RAM units, and then only after the tag RAM address comparison has successfully completed.

Figure 4:
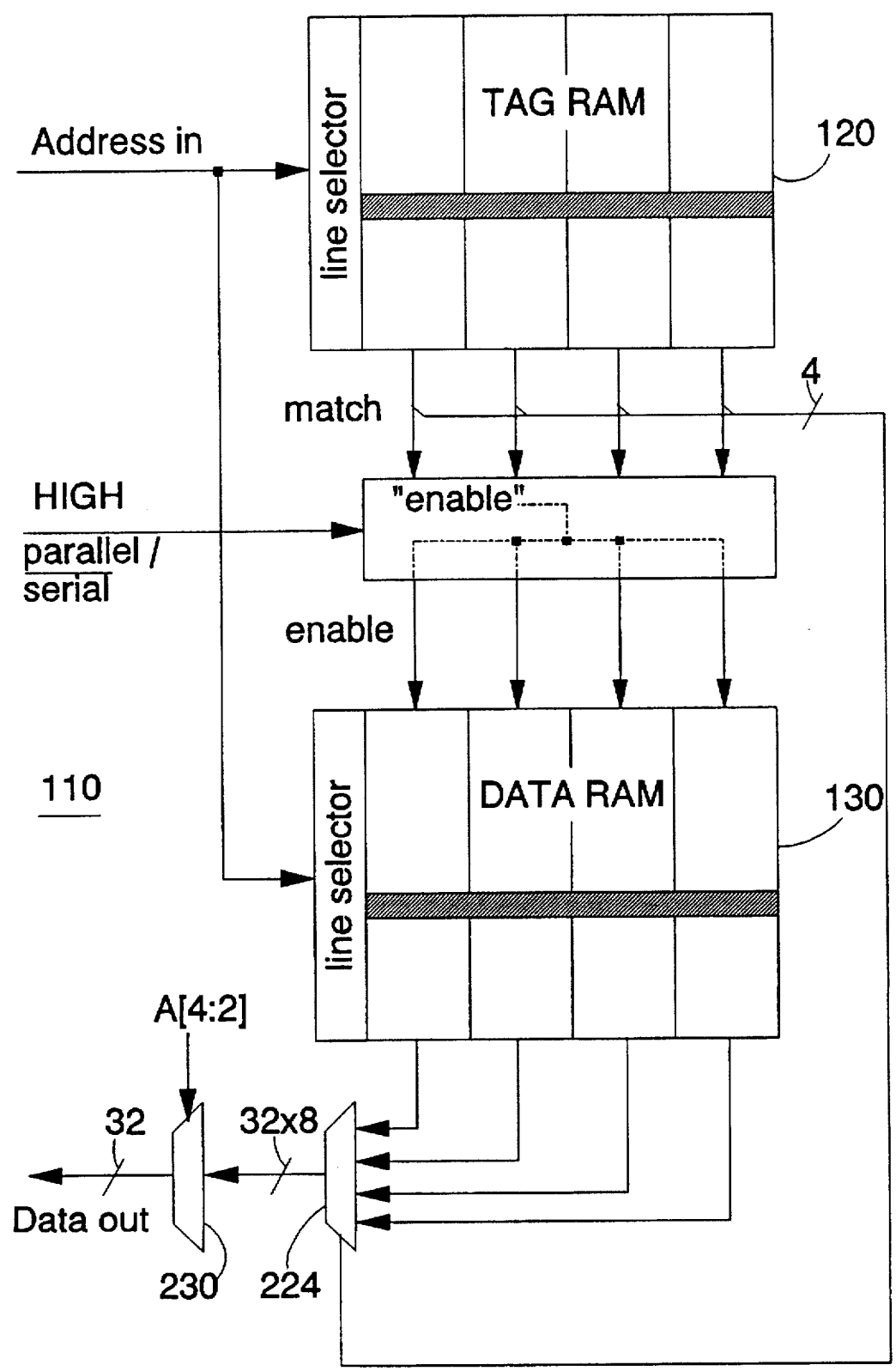
FIG. 4 is a schematic diagram showing the cache memory of FIG. 2 operating in a parallel access mode.

FIG. 4 is a schematic diagram showing the operation of the cache RAM 110 in the parallel access mode (i.e. the parallel/not serial signal is HIGH). Here, the effective operation of the OR gates 222 is shown schematically as an enable signal being supplied to all of the data RAM units irrespective of which tag unit outputs a match signal, and at substantially the same time as the tag RAM comparison is being made.

Figure 5:
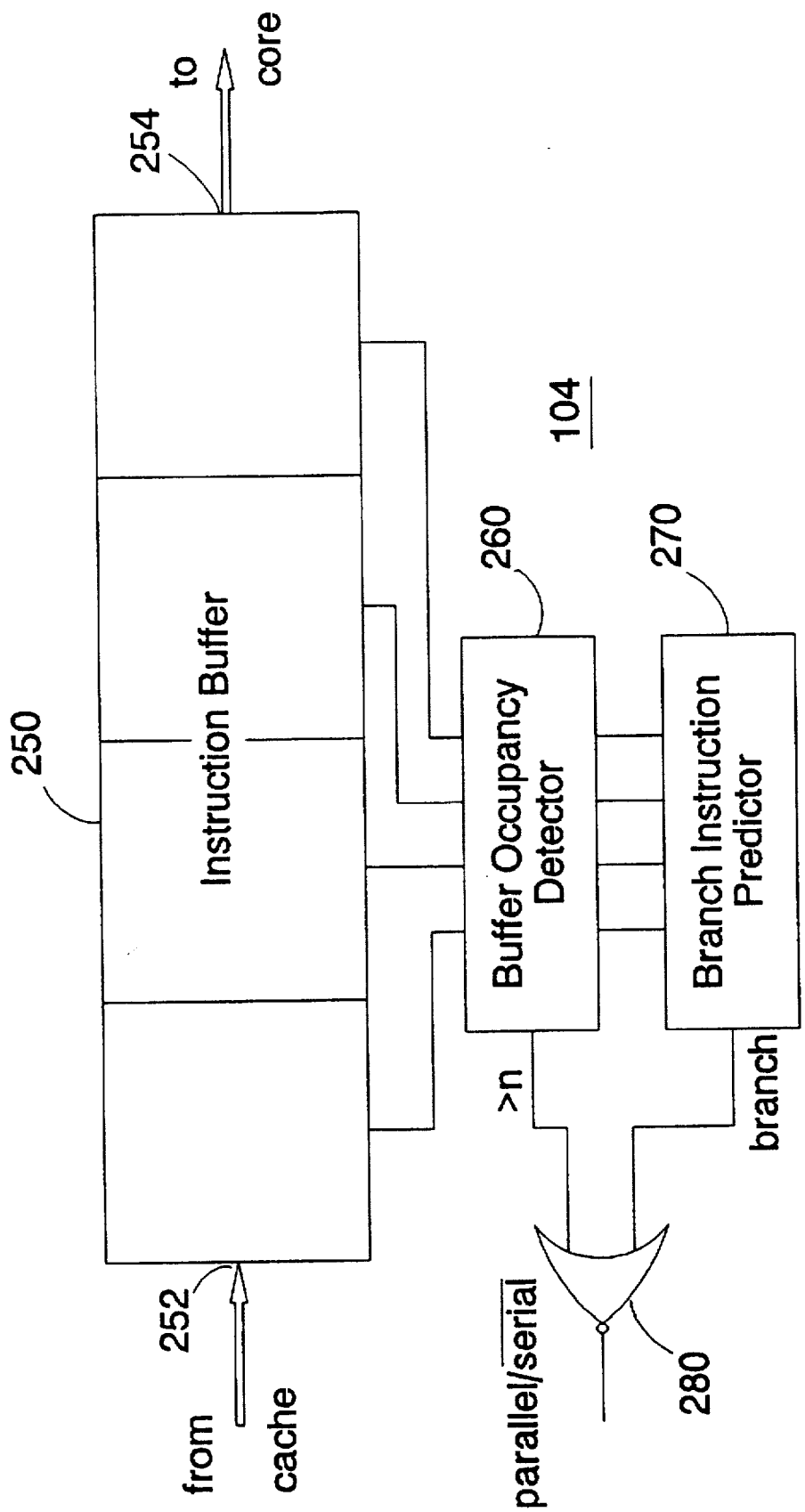
FIG. 5 is a schematic diagram of a profetch unit.

FIG. 5 is a schematic diagram of the prefetch unit 104, and will be used to describe one example of a set of rules used to decide whether serial or parallel access should be used.

The prefetch unit comprises a FIFO buffer 250 which receives and stores instructions read from the cache RAM at its input 252. As instructions are read from the FIFO buffer output 254, the stored instructions progress along the buffer towards the output 254.

In FIG. 5 the buffer is illustrated as storing four instructions. However, in reality, the buffer in the present embodiment stores eight instructions. The diagram shows a smaller buffer merely for simplicity of description of the principles of operation.

The contents of the buffer are monitored by a buffer occupancy detector 260 and a branch instruction predictor 270.

The buffer occupancy detector detects how many instructions are stored in the buffer 250. In itself, this is a known technique, and has previously been used to prevent the further fetching of instructions when the buffer already holds sufficient fetched instructions. However, here the buffer occupancy detector is also used to detect whether the buffer holds more than a predetermined number of instructions. For example, the buffer occupancy detector could detect whether the buffer is half-full (holding four instructions in the case of an eight-instruction buffer). If this condition is met then further fetching operations can be carried out using the slower, serial access mode. To this end, the buffer occupancy detector generates a high output if the buffer holds more than n instructions, and this is passed by a NOR gate 280 to form the parallel/not serial signal. (As described above, the parallel/not serial signal is low when serial access is required).

The branch instruction predictor 270 is again, in itself, a known device, and is used to examine the instructions held in the buffer to detect whether any of the instructions are branch instructions which are likely to be taken (e.g. unconditional branches or conditional branches where the branch instruction predictor can detect or make assumptions for the branch conditions). In this case, assuming that the branch is at least a predetermined number of instructions from the output 254 of the FIFO buffer 250 (e.g. at least the second instruction from the output of the FIFO buffer 250), the instructions at the branch destination or target address can be fetched more slowly using the serial access mode. (The position of the branch instruction along the FIFO buffer is easily detectable by a conventional branch instruction predictor). Accordingly, in these circumstances the branch instruction predictor 270 sends a high signal to the NOR gate 280, which in turn outputs a low value of the parallel/not serial signal.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A data processing apparatus comprising:
   (A) a cache memory having a plurality of data memory sections, each storing one or more data words, each said data memory section being operable to output a stored data word in response to an enable signal;
   a plurality of tag memory sections, each corresponding to a respective data memory section, said tag memory sections storing address information indicative of a memory address of each data word stored in said corresponding data memory section; and
   means for comparing a memory address of a required data word with said address information stored in said tag memory sections, said comparing means generating match signals indicating whether said required data word is stored in one of said data memory sections and, if so, identifying one of said data memory sections in which said required data word is stored;

said cache memory being selectively operable in at least a first mode and a second mode, in which:
(i) in said first mode, only that one of said data memory sections in which said required data word is stored is enabled for operation in response to said match signals; and
(ii) in said second mode, two or more of said data memory sections are enabled for operation substantially concurrently with operation of said comparing means, said match signals being used to select the output of one of said data memory sections;

(B) a prefetch unit for prefetching and buffering data processing instructions from said cache memory; and (C) means responsive to said instructions stored in said prefetch unit for controlling said cache memory to operate in either said first mode or said second mode of operation.

2. A data processing apparatus according to claim 1, in which each data memory section is operable to store an array of data words, a position of each data word within said array being determined by selected bits of the memory address of said data word.

3. A data processing apparatus according to claim 1, comprising a multiplexer connected to receive data output by each of said data memory sections, said multiplexer being operable to select the output of one of said data memory sections in response to said match signals.

4. A data processing apparatus according to claim 1, comprising logic means for supplying said match signals to said data memory sections as respective enable signals in said first mode of operation, and for enabling all of said data memory sections in said second mode of operation.

5. A data processing apparatus according to claim 1, in which said prefetch unit is operable to select said first mode if at least a predetermined number of instructions are buffered in said prefetch unit.

6. A data processing apparatus according to claim 5, in which said prefetch unit is operable to select said first mode if a branch instruction is detected in said instructions buffered in said prefetch unit.

7. A data processing apparatus according to claim 1, in which said prefetch unit is operable to select said first mode if a branch instruction is detected in said instructions buffered in said prefetch unit.

8. A cache memory comprising:
a plurality of data memory sections, each storing one or more data words, each said data memory section being operable to output a stored data word in response to an enable signal;

a plurality of tag memory sections, each corresponding to a respective data memory section, said tag memory sections storing address information indicative of a memory address of each data word stored in said corresponding data memory section; and means for comparing a memory address of a required data word with said address information stored in said tag memory sections, said comparing means generating match signals indicating whether said required data word is stored in one of said data memory sections and, if so, identifying one of said data memory sections in which said required data word is stored;

said cache memory being selectively operable in at least a first mode and a second mode, said first mode or said second mode being selected in response to instructions stored in a prefetch unit for prefetching and buffering data processing instructions from said cache memory, in which:
(i) in said first mode, only that one of said memory sections in which said required data word is stored is enabled for operation in response to said match signals; and
(ii) in said second mode, two or more of said data memory sections are enabled for operation substantially concurrently with operation of said comparing means, said match signals being used to select the output of one of said data memory sections.

9. A central processing unit for accessing data stored in a cache memory according to claim 8, said central processing unit comprising:
a prefetch unit for prefetching and buffering data processing instructions from said cache memory; and means responsive to said instructions stored in said prefetch unit for controlling said cache memory to operate in either said first mode or said second mode of operation.

* * * * *